United States Patent [19]

Lukasiewicz et al.

[11] Patent Number: 5,601,721
[45] Date of Patent: Feb. 11, 1997

[54] METHOD FOR REDUCING THE SELENIUM CONCENTRATION IN AN OIL REFINERY EFFLUENT

[75] Inventors: Ronald J. Lukasiewicz, Irvine; Darrel L. Gallup, Chino Hills; Brian J. Kelly, Corona, all of Calif.

[73] Assignee: Union Oil Company of California, El Segundo, Calif.

[21] Appl. No.: 236,548

[22] Filed: Apr. 29, 1994

[51] Int. Cl.$^6$ .................................................... C02F 1/42
[52] U.S. Cl. ........................ 210/670; 210/672; 210/684; 210/688
[58] Field of Search ................................... 210/683, 684, 210/685, 688, 670, 672

[56] References Cited

U.S. PATENT DOCUMENTS

| | | | |
|---|---|---|---|
| 4,518,504 | 5/1985 | Wolcott | 210/670 |
| 4,790,945 | 12/1988 | Baker | 210/712 |
| 4,915,928 | 4/1990 | Marcantonio | 423/510 |
| 5,071,568 | 12/1991 | Bennett et al. | 210/754 |
| 5,264,133 | 11/1993 | Forschner et al. | 210/670 |
| 5,279,745 | 1/1994 | Jeffers et al. | 210/688 |
| 5,290,589 | 3/1994 | Clough et al. | 427/126.3 |
| 5,352,517 | 10/1994 | Clough et al. | 428/357 |

OTHER PUBLICATIONS

Bailey et al., "Sorption Onto and Recovery of Cr(VI) Using Iron–Oxide–Coated Sand", Wat. Sc. Tech. vol. 26, No. 5–6, pp. 1239–1244 (1992).

Technical Bulletin Fluid Process Chemicals, "Ion Exchange Resin–Countercurrent Regeneration Engineering Notes", Rohm and Haas Co., Philadelphia, PA., pp. 1–18, (Jan., 1986).

Avery et al., "Ion Exchange Treatment Process for Selective Removal of Cyanide", Rohm and Haas Co. Philadelphia, PA.

Technical Bulletin Fluid Process Chemicals, "Ion Exchange Resin–Cocurrent Regeneration Engineering Notes", Rohm and Haas Co., Philadelphia, PA. pp. 1–11 (Jan., 1986).

Separation Technologies, "Anion Exchange Resin", Rohm and Haas Co., Philadelphia, PA. (Sep., 1990).

Pontius, F. W. American Water Works Assoc., "Water Quality and Treatment", McGraw–Hill, Inc., 4th Edition, pp. 624–626.

Hayes, K. F. et al., "In Situ X–ray Absorption Study of Surface Complexes: Selenium Oxyanions on α–FeOOH, Science", vol. 238, pp. 783–785, (Nov., 1987).

Lien, R. H. et al., Proceedings of the Gold '90 Symposium, "chemical and Biological Cyanide Destruction and Selenium Removal From Precisious Metals Tailings Pond Water", Society for Mining, Metallurgy and Exploration, Inc. Littleton, Colorado, (1990).

Gottlieb, M. C., "Fundamentals of Ion Exchange", pp. 87–115.

Chevron's Mar. 31, 1989 report to the Regional Water Quality Control Board entitled "Control Stratregy for Selenium".

"Resintech™ SBACR1 Acrylic Anion Exchange Resin Type One".

EPA/540/SR–93/515 (Sep., 1993).

Boegel et al, "Selenium Oxidation and Removal by Ion Exchange", EPA/600/2–86/031, Mar. 1986.

Primary Examiner—Cynthia L. Nessler
Attorney, Agent, or Firm—Gregory F. Wirzbicki; Shlomo R. Frieman

[57] ABSTRACT

Selenium exists in oil refinery stripped sour water as selenocyanate and can be effectively removed using an acrylic, strong base, anion exchange column or stannous chloride. The acrylic, strong base, anion exchange column can also be employed to remove arsenic, iron, and vanadium from an aqueous fluid.

28 Claims, 1 Drawing Sheet

METHOD FOR REDUCING THE SELENIUM CONCENTRATION IN AN OIL REFINERY EFFLUENT

BACKGROUND

This invention relates to (a) processes for removing selenocyanate, arsenic, iron, and vanadium from an aqueous fluid and, in particular, to a method for reducing the concentration of these materials in an oil refinery effluent, and (b) an apparatus for removing selenate and selenite from an aqueous fluid.

Several parts of the San Francisco Bay Estuary, including Suisun Bay, San Pablo Bay, and the Carduinez Straits, have been classified by the U.S. Environmental Protection Agency (EPA) under Section 304(1) of the Clean Water Act as impaired due to the impact of selenium on waterfowl. As a result of this classification, in 1991 the San Francisco Regional Water Quality Control Board (Board) amended the National Pollution Discharge Elimination System (NPDES) permits for the six refineries discharging into the estuary to include specific permit limits on total selenium, with a compliance deadline of Dec. 12, 1993. Each refinery was given a mass discharge limit for total selenium. This limit was based on either previous performance, or an effluent concentration of 50 parts per billion (ppb), whichever resulted in the lower limit.

Even before the establishment of the limit on total selenium by the Board, the various refineries had been working to develop control strategies, including treatment options, to meet the 50 ppb limit on total selenium. Nevertheless, despite studying over 50 treatment technology variations, no treatment option was found or developed to achieve this limit which did not have serious negative environmental consequences, such as generation of large amounts of hazardous sludge or increased levels of copper in the effluent.

Among the numerous technologies tested was an ion exchange process described in U.S. Pat. No. 4,915,928 and several acidification techniques. However, since no new control option could be developed in time to meet the December, 1993 compliance deadline for the 50 ppb limit, the refineries requested an extension of the compliance period in a proposal to the San Francisco Regional Water Quality Control Board entitled Removal of Selenium from Refinery Discharges ("Extension Proposal"). In the Extension Proposal, the ion exchange process is summarized as follows:

Chevron Ion Exchange Process

Chevron developed an ion exchange process using a Type 1 gel resin. The process concentrates selenium from dilute solutions and produces a stable selenium product. The process was tested at the pilot scale and achieved greater than 90% removal for two SSW {stripped sour water} streams, but only poor removal for two other SSW streams which contained the majority of selenium {citing Chevron. Control strategy for selenium. Mar. 31, 1989. Report submitted to Regional Water Quality Control Board ("Chevron Report")}. Even with the stream on which the ion exchange was effective, the process was vulnerable to upset conditions in the sour water strippers {citing Chevron Report}.

Furthermore, the Extension Proposal (Table 3, page 11) notes that the Chevron ion exchange technology is "not feasible despite observed effectiveness." In addition, the Chevron Report at page 21 states:

The Chevron Ion Exchange Process for removing selenium from Richmond Refinery stripped sour waters is not practicable because:

* Costs, roughly $11,000/lb removed, are orders of magnitude above what EPA reports in its cost-effectiveness guidance;
* Receiving water selenium concentrations are orders of magnitude below the level the SWRCB {sic; State Regional Water Quality Control Board} recommends as below harmful effects.

The Extension Proposal comments on the acidification procedures as follows:

Acidification/Degassing

Selenium is present in sour water as the selenide ($Se^{2-}$) or biselenide ($HSe^-$) anion as would be expected if selenium behaves similarly to sulfur, stripping of the sample at reduced pH should remove selenium. Exxon tested this method on samples of (unstripped) sour water and found that a significant fraction of the selenium could be removed by heating samples of sour water at low pH {citation omitted}. This is consistent with their finding that selenium is stripped along with sulfur in the sour water strippers. However, Exxon also found that a maximum of about 60% selenium removal could be achieved at a pH of 1. Such a low pH is impractical to operate at, and 60% removal from sour water would not be nearly sufficient to meet a 50 ppb limit. Acidification/degassing on sour water stripper bottoms (stripped sour water—SSW) was tested by Exxon, Shell, and Unocal {citations omitted}. Only poor removal (<30%) could be obtained when either air or nitrogen sparging at pH <2 was used. Acidification followed by aeration may also remove soluble selenium by oxidizing selenide to elemental selenium which is then allowed to precipitate. Chevron found that a maximum of 47% removal could be achieved in this manner, and the results were not very reproducible.

SUMMARY OF THE INVENTION

The present invention provides practical methods for reducing the selenium concentration in an aqueous liquid, especially oil refinery stripped sour water. In particular, it has been discovered that the bulk of selenium in oil refinery stripped sour waters is present as selenocyanate and that the selenocyanate is removed from the stripped sour waters by the sequential steps of (a) contacting the stripped sour waters with a prefilter; (b) passing the prefilter effluent through an acrylic, strong base, anion exchange resin to produce an aqueous effluent having a selenocyanate concentration less than 10 percent of the selenocyanate concentration present in the stripped sour water; and (c) eluting the resin with an aqueous solution to form a selenocyanate-containing eluent.

In addition to achieving surprisingly high selenocyanate removal efficiencies, the ion exchange process of the present invention is also very remarkable in that, in contrast to the ion exchange process taught in U.S. Pat. No. 4,915,928, the acrylic, strong base, anion exchange resin does not tend to foul. Therefore, there is essentially little or no need to regenerate the resin, for example, as required in U.S. Pat. No. 4,915,928 with an acidic chlorate solution.

Other materials, e.g., arsenic, iron, and/or vanadium, are also removed from oil refinery stripped sour water as well as other aqueous fluids using the foregoing ion exchange procedure. This fact is unexpected because arsenic, iron, and vanadium are at best poorly removed from stripped sour water using a polystyrene, strong base, anion exchange resin.

In another selenium removal process of the present invention, selenium is removed from an aqueous liquid by contacting the liquid with stannous chloride to form a selenium-containing precipitate. Selenium removal efficiencies up to about 98% and greater are achieved when the amount of stannous chloride employed is sufficient to reduce the pH of the aqueous liquid to about 2 or less.

Furthermore, the invention also provides an adsorbent for removing selenite and selenate. The adsorbent comprises (a) an inorganic, silica-containing substrate having a surface area greater than about 10 $m^2/g$; and (b) ferrihydrite (FeOOH) coated on the surface area of the substrate.

BRIEF DESCRIPTION OF THE DRAWINGS

The removal of selenocyanate from stripped sour water using an acrylic, strong base, anion exchange resin or stannous chloride as well as other features, aspects, and advantages of the present invention will be better understood with reference to the following description, appended claims, and Figure, wherein the sole Figure is a schematic diagram of a process for removing a substance selected from the group consisting of selenium, arsenic, iron, and vanadium from an aqueous fluid (e.g., stripped sour water).

DETAILED DESCRIPTION OF THE INVENTION

Figure 1:
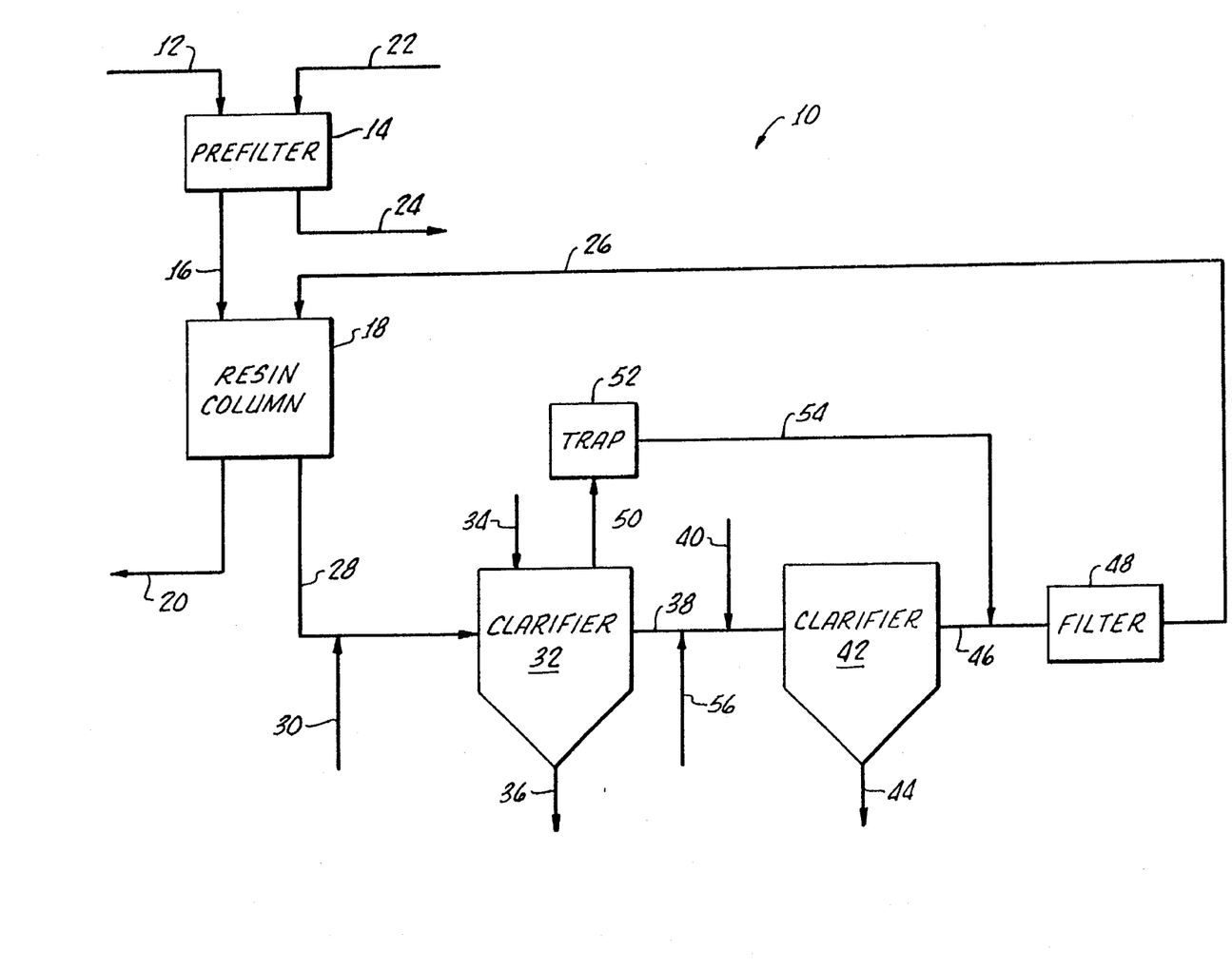

As shown in the sole Figure, in an exemplary system 10 embodying features of the present invention, a conduit 12 feeds a stripped sour water from, for example, a coker (not shown), a reformer (not shown), and/or a fluid catalytic cracker (not shown), into a prefilter 14. The stripped sour water contains selenium primarily in the form of selenocyanate. The selenium content of the stripped sour water is typically greater than about 1 ppm and more commonly exceeds about 5 ppm.

The prefilter 14, whose purpose is to remove particulate matter and various dissolved substances (e.g., selenate and selenite) from the stripped sour water, contains sand or an adsorptive material. Exemplary adsorptive materials include, but are not limited to, iron-oxide-coated sand (see Bailey et al., *Wat. Sci. Tech.*, 26(5–6):1239–1244 (1992), immobilized extractant-containing polymer beads (see U.S. Pat. No. 5,279,745), and porous supports having exchanged thereon metal ions selected transition metal and alkali earth metal ions (see U.S. Pat. No. 5,264,133), the foregoing three documents being incorporated herein in their entireties by reference. Another adsorptive material comprises (i) an inorganic, silica-containing substrate having a surface area greater than about 10 $m^2/g$ and (ii) ferrihydrite (FeOOH) coated on the surface area of the substrate. To increase the adsorption capacity of the adsorbent, the substrate preferably has as large a surface area as feasible (e.g., about 100 $m^2/g$ or greater). In terms of mesh size, the substrate typically has a mesh size greater than about 8 and preferably at least about 10. (The higher the mesh size, the larger the surface area.)

The effluent from the prefilter 14 enters a conduit 16 and is transported to an ion exchange column 18 which contains a Type I and/or Type II, acrylic, strong base, anion exchange resin. (Type I strong base resins use trimethylamine to form the exchange site and Type II strong base resins use dimethylethanolamine.) Exemplary Type I, acrylic, strong base, anion exchange resins include, but are not limited to, SBACR1 marketed by RESINTECH, Cherry Hill, N.J. and Amberlite® IRA-458 and IRA-958 sold by Rohm & Haas, Philadelphia, Pa. The acrylic, strong base, anion exchange resin removes selenocyanate. In addition, the resin usually is effective for removing one or more (and preferably all) of arsenic-, iron-, and vanadium-containing anionic species present in the stripped sour water.

The stripped sour water is generally contacted with the acrylic, strong base, anion exchange resin at a rate of about 0.25 to about 4, preferably about 0.5 to about 3, more preferably about 1 to about 2, and most preferably about 1.5, $gpm/ft^3$ of bed volume. Usually a bed depth of at least about 30 inches is desirable, with the temperature normally being under about 50° C. and the exchange capacity being about 1 to about 1.4 milliequivalents/ml.

The effluent from the ion exchange column 18 is directed through a conduit 20 to a suitable discharge point, e.g., a biotreatment plant (not shown).

After the prefilter 14 has been loaded, it is either discarded (in the case of a sand) or regenerated with a base (e.g., a sodium hydroxide solution (about 10 weight percent) in the case of adsorptive filters) which enters and exits the prefilter 14 through conduits 22 and 24, respectively. When regenerated, the prefilter 14 is backwashed with water before and/or after (and preferably after) being regenerated. The backwash water enters and exits the prefilter 14 through respective conduits 24 and 22.

Generally, after the ion exchange resin 18 has been loaded, it is eluted with a solution of an alkali metal chloride (e.g., sodium chloride, potassium chloride) which is introduced into the resin 18 through a conduit 26. (As used in the specification and claims, the term "loaded" as used in reference to the ion exchange resin means that at least about 75 percent of the resin exchange sites are occupied by anionic species other than the anionic specie present in the eluent. Prior to the resin 18 being loaded, the resin effluent concentration of the anionic specie being removed by the resin 18 is generally less than about 50, preferably less than about 25 and more preferably less than about 15, percent of the concentration of the anionic specie in the resin influent. Typically, prior to the resin 18 being loaded, the concentration of the anion specie in the resin effluent is at least about 1, more typically at least about 5, and most typically at least about 10, percent of the concentration of the anionic specie in the resin influent.)

Preferably, the eluent is devoid of a base (e.g., sodium hydroxide) and comprises about 10 to about 30, more preferably about 15 to about 25, and most preferably about 20, weight percent sodium chloride. In addition, the eluent is typically employed at ambient temperature, i.e., at a temperature from about 0° C. (32° F.) to about 25° C. (77° F.). Furthermore, since selenium diffusion is rate controlling in the elution of the ion exchange column 18, the flow rate of the eluent is preferably slow, e.g., about 0.1 to about 0.8 $gpm/ft^3$.

Before and/or after being eluted, the ion exchange resin 18 is also backwashed with water which enters and exits the ion exchange resin 18 through the conduits 28 and 26, respectively.

Preferably, the ion exchange resin 18 is operated in a 2-bed "merry-go-round" mode as described in Avery et al., "Ion Exchange Treatment Process For Selective Removal Of Cyanide" *Amber-hi-lites*, Rohm & Haas, Philadelphia, Pa., this publication being incorporated herein in its entirety by reference.

The eluent from the ion exchange zone 18 exits via the conduit 28. The eluent is then treated by any one of several techniques to remove the selenocyanate so that the eluent can be reused in the foregoing process. In one technique, copper chloride is fed through an injection conduit 30 into the conduit 28 for the purpose of precipitating the selenocyanate present in the eluent. The amount of copper chloride employed is generally sufficient to remove at least about 90, and more preferably at least about 95, percent of the selenium present in the effluent eluent. In terms of parts per million (ppm), the quantity of copper chloride generally used is adequate for copper chloride concentration in the eluent to be at least about 2,000. Preferably, the copper chloride concentration in the eluent is less than about 20,000, more preferably less than 10,000, even more preferably less than about 6,000, and most preferably about 3,000 to about 5,000 ppm.

The copper chloride-eluent combination then enters a clarifier 32 and is mixed with a flocculent (e.g., polyacrylamide) introduced into the clarifier 32 through an injection line 34. Anionic and cationic flocculents can be used, with the former being preferred.

The flocculating agent flocculates the precipitate, and the flocculated precipitate exits the clarifier 32 through a conduit 36, with the supernatant leaving the clarifier 32 via a conduit 38. The precipitate is filtered through a high pressure dewatering filter (not shown; such as a Pneumapress™ brand dewatering filter manufactured by J&M Industrial Supply Co., Richmond, Calif.) to produce a wet filter cake. The wet filter cake is washed with water to remove entrained salts and then disposed of in an environmentally acceptable manner or sold to a metal reclamation facility.

To reduce the concentration of copper in the supernatant, a base (e.g., sodium hydroxide) is introduced through a conduit 40 into the supernatant to raise the pH of the supernatant to above about 9, thereby forming a copper-containing precipitate. The resulting mixture is fed into another clarifier 42. The copper-containing precipitate leaves the clarifier 42 through exit conduit 44, while the modified supernatant departs through a conduit 46. The modified supernatant then passes through an adsorptive filter 48 (such as those discussed above with respect to the prefilter 14), which further reduces the selenium and copper content of the supernatant. The effluent from the adsorptive filter 48 enters the conduit 26 and is recycled to the ion exchange bed 18 for reuse.

In another eluent treatment process, the eluent in conduit 28 is contacted with an acid (e.g., hydrochloric acid) or a pH reducing composition (e.g., stannous chloride) introduced via the conduit 30. In general, best results are obtained when the pH of the eluent is reduced to about 2 or less and preferably to about 0.5 to about 1.5.

The pH reduced eluent then enters the clarifier 32 and is mixed with an anionic flocculent introduced therein via the injection line 34. The flocculated precipitate leaves the clarifier 32 through the exit conduit 36, with the supernatant departing the clarifier 32 via the conduit 38.

Cyanide gas exits the clarifier 32 through a gas conduit 50 and is captured in a caustic solution-containing cyanide trap 52 (e.g., a sodium hydroxide-containing cyanide trap). The effluent from the cyanide trap is returned to the conduit 46 via a conduit 54.

In addition, any cyanide in the supernatant leaving the clarifier 32 through the conduit 38 is destroyed by the introduction of an oxidizing agent (e.g., a 30 weight percent hydrogen peroxide solution, a 5 weight percent sodium hypochlorite solution) via a conduit 56. The pH of the resulting supernatant is then neutralized by adding sodium hydroxide or other suitable base through the conduit 40. The neutralized supernatant is optionally passed through the adsorptive filter 48 or directly recycled to the ion exchange bed 18.

An interesting aspect of the present invention is that acrylic, strong base, anion exchange resins remain unfouled. Accordingly, there is no need to regenerate the acrylic, strong base, anion exchange resin even after 25, 50, or even 100 elution cycles.

Another interesting facet of the invention is that acrylic, strong base, anion exchange resins are much more efficient for removing arsenic, iron, and vanadium from an aqueous fluid than polystyrene, strong base, anion exchange resins. This fact is documented below in Examples 13–14.

In another process embodying features of the present invention the prefilter 14 and the resin zone 18 are not employed. In this version, the stripped sour water is contacted in the conduit 28 with a sufficient amount of stannous chloride (introduced via the line 30) to reduce the pH of the water to about 3 or less. In general, as the pH of the stannous chloride-treated water decreases, the amount of selenium removed from the stripped sour water increases. Accordingly, the pH of the stripped sour water is preferably reduced to about 2 or less, more preferably to about 1.5 or less, and most preferably to about 1 or less. The stannous chloride-treated water is then passed through the clarifier 32 and handled as discussed above with respect to the treatment of the eluent effluent with stannous chloride.

The efficiency of stannous chloride to reduce the selenium content of stripped sour water is surprising because, as shown below in Examples 87–97, a related compound, namely, stannic chloride, has very little effect on lowering the selenium concentration of such water even at low pH.

EXAMPLES

The following examples are intended to illustrate, and not limit, the invention. Example 1 describes a selenium speciation procedure; Examples 2–8 document the preparation of ferrihydrite-coated adsorptive filters; Examples 9–12 detail pilot studies of selenium removal from stripped sour water at an oil refinery; Examples 13–14 report comparative tests for removing arsenic, iron, and vanadium by two ion exchange resins; Examples 15–23 narrate comparative tests for the removal of arsenic by a variety of adsorptive filters; Examples 24–30 describe selenium removal using stannous chloride; Examples 31–33 document selenium removal using silver nitrate; Examples 34–54 detail selenium and cyanide removal from an eluent; Examples 55–71 detail the removal of selenium from an eluent using a variety of agents; Examples 72–86 show the removal of selenium from stripped sour water and an eluent using hydrochloric acid; and Examples 87–97 contrast the ability of stannous chloride and stannic chloride to precipitate selenium in stripped sour water.

EXAMPLE 1

Selenium Speciation Procedure

Three samples were evaluated from a San Francisco Bay area oil refinery. The selenium content of each sample was speciated using high performance liquid chromatography (HPLC) to separate the selenium species followed by an on-line detection of the individual selenium peaks using inductively coupled plasma mass spectrometry (ICP-MS).

The ion chromatography separation step was accomplished by using a liquid chromatography instrument which was capable of delivering a precisely controlled flow rate of eluent at 1 ml per minute at 450 psi. The separation was performed in the isocratic mode with a single eluent solution. More specifically, the separation was accomplished employing a hydrophilic anion exchange column with an alkanol quaternary amine functional group. The eluent composition employed consisted of 4.3 millimolar sodium bicarbonate, 3.4 millimolar sodium carbonate, and 0.8 millimolar p-hydroxybenzonitrile in reagent grade water. The flow rate of the eluent through the anion exchange column was 1 ml per minute and sodium was removed from the eluent by means of a post-column micro-membrane suppressor prior to injecting the eluent stream to the ICP-MS detector. A 25 millimolar sulfuric acid solution was used to exchange hydrogen ions for sodium ions in the eluent passing through the micro-membrane suppressor.

The eluent solution exiting the suppressor was directed to the ICP-MS detector by means of a 1.4 meter length of Teflon brand capillary tubing. The capillary tubing was connected to a low dead volume concentric glass nebulizer which was mounted in a standard chilled inlet system for the ICP-MS instrument. Selenium peaks were monitored at mass 82 employing a time resolved data acquisition option provided with the standard data system for the ICP-MS instrument. Selenium peaks were identified by comparing retention times to those of standard solutions prepared from pure selenium-containing compounds. Quantification was accomplished using the peak area provision in time resolved software and standard calibration curves. The results are set forth in the following Table A. In addition, the total selenium content of each of the three samples was also analyzed by hydride atomic absorption (AA) and the data is also listed below in Table A.

TABLE A

Speciation And Total Selenium Data

| | Concentration, ppb | | | | |
|---|---|---|---|---|---|
| | HPLC-ICP-MS[a] | | | | AA[b] |
| Sample | $SeO_3^{-2}$ | $SeO_4^{-2}$ | $SeCN^-$ | Sum | Total |
| Refinery Discharge | 300 | 63 | <50 | 360 | 330 |
| Phenolic Sour Water | 200 | <100 | 7300 | 7500 | 6100 |
| Non-Phenolic Sour Water | <15 | <20 | 70 | 70 | 100 |

[a]Results obtained by the HPLC-ICP-MS.
[b]Results obtained by Hydride AA.

The selenium concentration sums obtained using an exemplary speciation methodology of the present invention correlates well with the total selenium concentrations detected employing a hydride AA technique.

EXAMPLES 2–8

Preparation Of Ferrihydrite-Coated Adsorbent Materials

In each of Examples 2–8, a solid substrate (about 30 ml) was placed in an evaporating dish and about 12 ml of 2.5 M $FeCl_3.6H_2O$ was then added to the dish. Next, about 2.7 ml of 1 M NaOH was added to the dish and the dish contents were gently stirred with a spatula. The dish and its content were then heated at about 109.85° C. (383° K.) for about 3 hours with occasional stirring. Next, the resulting solid was calcined for about 3 hours at about 549.9° C. (823° K.). The calcined material was cooled to room temperature and about 6 ml of the above described $FeCl_3.6H_2O$ was added to the calcined material-containing dish. Finally, the resulting material was re-dried overnight at about 109.85° C. (383° K.) to form a ferrihydrite-coated adsorbent material.

Characteristics of the ferrihydrite-coated adsorbent material prepared by the foregoing procedure are set forth in the following Table B.

TABLE B

| Ex | Substrate | Fe, wt % | BET[a] Surface area, $m^2/g$ |
|---|---|---|---|
| 2 | Synthetic zeolite[b] | 10.8 | 255 |
| 3 | Silicalite catalyst | 9.1 | 280 |
| 4 | Silica gel | 8.9 | 363 |
| 5 | Sand | 4.3 | <1 |
| 6 | Clinoptilolite/chabazite (natural zeolite) | 15.5 | 19 |
| 7 | Clinoptilolite (natural zeolite) | 12.9 | 20 |
| 8 | Chabazite (natural zeolite) | 14.0 | 122 |

[a]BET means Brunauer-Emmett-Teller gas adsorption method.
[b]ZSM-5 brand synthetic zeolite.

EXAMPLE 9–12

Pilot Study Of Selenium Removal From Stripped Oil Refinery Sour Water

Test Configuration

The following four columnar experiments were conducted:

A. Fe-exchanged chabazite adsorptive filter column coupled to a Rohm & Haas IRA-458 brand acrylic, Type 1, strongly basic anion exchange resin column.

B. FeOOH-coated chabazite adsorptive filter column prepared in Example 8 coupled to the IRA-458 brand acrylic, Type 1, strongly basic anion exchange resin column.

C. IRA-458 brand acrylic, Type 1, strongly basic anion exchange resin column.

D. Resin Tech SBACR1 brand acrylic, Type 1, strongly basic anion exchange resin column.

Stripped sour oil refinery process water, termed influent, was introduced under a nitrogen blanket into each of the four column sets from a sample tap. The stripped sour oil refinery process water provided a capacity of at least about 30 ml/minute. Periodically, small influent and effluent samples were collected and analyzed.

Test Procedure

1. Selenium Removal Cycle: During selenium removal/loading, the stripped sour oil refinery process water influent rate to the 50 ml columns was established at about 1.5 gallons per minute (gpm) per cubic foot (cf) so that the rate of flow through the column was about 10 ml/minute, as measured at the effluent. This cycle proceeded uninterrupted for about 12 hours so that about 150 bed volumes (BV) of water were treated. About every two hours (about 25 BV), one influent sample and one effluent sample (about 10–15 ml each) were collected for selenium analysis. After about 12 hours of flow, the influent stripped sour oil refinery process water flow was shut off.

2. Wash Cycle: Before column elution, the resins and adsorptive filters were rinsed with water (domestic or distilled). Each column set was rinsed with about 100 ml (about 2 BV) of water at a convenient flow rate (no faster than about 100 ml per 5 minutes).

3. Elution Cycle:

(1) Adsorptive Filters. The adsorptive filter columns were detached from the resin columns. A sodium hydroxide solution (about 10 wt% NaOH) was allowed to pass through the filters at a rate of about 100 ml/hr (about 2 BV/hr). A total of about 400 ml (about 8 BV) was collected in about 4 hours and a small sample of the composite eluent was sampled and analyzed for selenium.

(2) Resins. The resin columns were eluted with a sodium chloride solution (about 15 to about 20 wt% NaCl) at a rate of about 100 ml/hr for about 4 hours in a manner similar to the above adsorptive filter elution procedure. A sample was collected for selenium analysis.

4. Column Conditioning: The filter and resin columns were rinsed with about 100 ml of water (similar to above step 2) to remove excess sodium hydroxide and sodium chloride, respectively.

5. Column Cycle: The adsorptive filters and resins were re-assembled and the steps 1–4 were repeated.

The results of the above pilot plant study are reported below in Table C.

TABLE C

BENCH-SCALE FIELD TEST

| | Column Efficiencies, % | | | |
|---|---|---|---|---|
| Cycle/Step | Ex 9: A | Ex 10: B | Ex 11: C | Ex 12: D |
| 1 | | | | |
| Loading/Removal | 99 | 99 | 96.5 | 100 |
| Elution | 82.3 | 82.4 | 86.8 | 96.4 |
| 2 | | | | |
| Loading/Removal | 100 | 100 | 100 | 100 |
| Elution | 88.9 | 86.6 | 75.8 | 69.5 |
| 3 | | | | |
| Loading/Removal | 100 | 100 | 99 | 93.9 |
| Elution | 69.1 | 78.5 | 74.3 | 73.5 |
| 4 | | | | |
| Loading/Removal | 100 | 100 | 100 | 97.5 |
| Elution | 74.4 | 75.3 | 73.8 | 72.7 |
| 5 | | | | |
| Loading/Removal | 100 | 100 | 100 | 99 |
| Elution 1 | 75.8 | 80.8 | 79 | 80.9 |
| Elution 2 | 1.1 | 1 | 1.2 | 0.9 |
| Total Elution | 76.9 | 81.8 | 80.2 | 81.8 |
| 6 | | | | |
| Loading/Removal | Out of Service | | 98.1 | 99.6 |
| Elution 1 | | | 85.7 | 83.6 |
| Elution 2 | | | 0.9 | 5.4 |
| Total Elution | | | 86.6 | 89 |
| 7 | | | | |
| Loading/Removal | | | 99.7 | 100 |
| Elution 1 | | | 85.6 | 84.5 |
| Elution 2 | | | 0.9 | 5.7 |
| Total Elution | | | 86.5 | 90.2 |
| 8 | | | | |
| Loading/Removal | | | 99.2 | 99 |
| Elution 1 | | | 87.6 | 84.2 |
| Elution 2 | | | 0.9 | 3 |
| Total Elution | | | 88.5 | 87.2 |
| 9 | | | | |
| Loading/Removal | | | 99.7 | 100 |
| Elution 1 | | | 85.7 | 83.2 |
| Elution 2 | | | 1.5 | 4.3 |
| Total Elution | | | 87.2 | 87.5 |

TABLE C-continued

BENCH-SCALE FIELD TEST

| | Column Efficiencies, % | | | |
|---|---|---|---|---|
| Cycle/Step | Ex 9: A | Ex 10: B | Ex 11: C | Ex 12: D |
| 10 | | | | |
| Loading/Removal | | | 98.2 | 100 |
| Elution | | | 90.5 | 89.9 |
| 11 | | | | |
| Loading/Removal | | | 98.5 | 96.4 |
| Elution | | | 82.3 | 69.4 |
| 12 | | | | |
| Loading/Removal | | | | |
| @ 144 Bed Volumes | | | 95.9 | 95.1 |
| @ 288 Bed Volumes | | | 88.5 | 92.4 |
| Elution 1 | | | 82.8 | 86.1 |
| Elution 2 | | | 1.4 | 7.3 |
| Total Elution | | | 84.2 | 93.4 |

The above data indicates that strong base, acrylic anion exchange resins successfully remove selenium from stripped sour water over at least 12 cycles. While the removal efficiencies varied from cycle to cycle, they typically were greater than about 95% and, in fact, approached 100% in many of the service cycles.

The elution efficiencies, which ranged from about 70 to about 90%, are based on the amount of selenium retrieved in the salt eluent solution compared to the amount of selenium removed during a respective cycle. It is believed that the elution efficiencies appear low due to analytical differences between detection of selenium in the stripped sour water and the 20 wt% sodium chloride eluent solution.

EXAMPLES 13–14

Comparative Test—Removal Of Arsenic., Iron, And Vanadium By Ion Exchange Resins

The test procedure was the same as employed in Examples 9–12 with a few modifications. Specifically, just columns C and D were used in Examples 13–14. In addition, instead of taking grab samples from the influent and effluent every two hours, a sample was taken from the entire volume of influent, effluent, and eluent utilized. The data generated in Examples 13–14 is listed in the following Table D.

TABLE D

Comparative Removal Results

| | | Ex 13 | Ex 14 | Ex 13 | Ex 14 |
| | | Effluent, ppm | | Eluent, ppm | |
| Element | Influent, ppm | Acrylic[a] Resin | Styrene[b] Resin | Acrylic Resin | Styrene Resin |
|---|---|---|---|---|---|
| As | 0.01 | <0.004 | 0.02 | NA[c] | NA |
| Fe | 0.2 | 0.02 | 0.1 | 7.5 | <0.2 |
| V | 0.2 | 0.03 | 0.2 | 9 | 1.1 |

[a]The acrylic resin was SBACR1 brand Type 1, strong base, acrylic resin.
[b]The styrene resin was a Dowex 11 brand Type 1, strong basic, polystyrene resin.
[c]NA denotes "not analyzed."

The data reported in the foregoing Table C, indicates that an acrylic, strong base resin removes arsenic, iron, and vanadium from an aqueous liquid much more efficiently than a polystyrene, strong base resin.

EXAMPLES 15–23

Comparative Test—Removal Of Arsenic By Adsorptive Filters

In each of Examples 15–23, about 0.4 g of an adsorptive filter was placed in a 40 ml vial with about 40 ml of an arsenic-containing water. (In some instances, the natural pH of the water (about 8.5) was adjusted to about 4 with sulfuric acid before the water was placed in the vial.) The vial was then shaken for about 5 minutes and the resulting liquid layer was analyzed for arsenic content. The results of this experiment are shown in the following Table E.

TABLE E

Comparative Arsenic Removal By Adsorptive Filters

| | | As, mg/l | |
|---|---|---|---|
| Ex | Adsorbent | pH 8.5 | pH 4 |
| 15 | Comparison - None | 12.3 | 14 |
| 16 | Comparison - FeOOH (+40 mesh) | 9.7 | 10.4 |
| 17 | Comparison - FeOOH Sand | 8.6 | 8.6 |
| 18 | Comparison - Chabazite (10–40 mesh) | 12.1 | 13.3 |
| 19 | FeOOH Chabazite (10–40 mesh) | 0.6 | 3.3 |
| 20 | Comparison - Clinpotilolite (4–8 mesh) | 12.5 | 13.9 |
| 21 | FeOOH Clinpotilolite (4–8 mesh) | 9.1 | 10.5 |
| 22 | Comparison - Clinpotilolite (12–35 mesh) | 12.3 | 13.7 |
| 23 | FeOOH Clinpotilolite (12–35 mesh) | 0.6 | 3.3 |

The results reported in above Table E indicate that inorganic, silica-containing substrates having a surface area greater than about 10 m$^2$/6 and coated with ferrihydrate (e.g., FeOOH-coated clinpotilolite (12–35 mesh) and FeOOH-coated chabazite (10–40 mesh)) adsorb arsenic much more efficiently than corresponding materials devoid of an FeOOH coating and FeOOH-coated sand.

EXAMPLES 24–30

Selenium Removal Using Stannous Chloride

An oil refinery phenolic sour water having a selenium concentration of about 5.4 ppm was contacted with varying stannous chloride concentrations to precipitate selenium. The selenium concentration in the resulting liquid phase was measured and the results are reported below in Table G.

TABLE G

Selenium Removal With Stannous Chloride

| Ex | Stannous Chloride Dosage, ppm | Final Selenium Concentration, ppm | Selenium Removal, % |
|---|---|---|---|
| 24 | 0 | 5.4 | — |
| 25 | 1300 | 1.6 | 67 |
| 26 | 2240 | 0.2 | 96 |
| 27 | 2500 | 3.8 | 30 |
| 28 | 2500 | 0.2 | 96 |
| 29 | 2500 | 0.2 | 96 |
| 30 | 5000 | 0.1 | 98 |

The above data indicate that selenium removal rates in excess of 95% are achievable using stannous chloride.

EXAMPLES 31–33

Selenium Removal Using Silver Nitrate

An oil refinery phenolic sour water having a selenium concentration of about 4.9 ppm was contacted with silver nitrate concentration to precipitate selenium. The selenium concentration in the resulting liquid phase was measured and the results are reported below in Table H.

TABLE H

Selenium Removal With Silver Nitrate

| Ex | Silver Nitrate Dosage, ppm | Final Selenium Concentration, ppm | Selenium Removal, % |
|---|---|---|---|
| 31 | 0 | 4.9 | — |
| 32 | 160 | 0.4 | 92 |
| 33 | 160 | 0.7 | 86 |

The above data indicate that selenium removal rates in excess of 90% are achievable using silver nitrate.

EXAMPLES 34–54

Selenium And Cyanide Removal From Eluent

To a 20 wt % NaCl eluent solution containing Se and CN was added various precipitating agents. The resulting liquid phase was analyzed for Se and CN and the results are reported in the following Table I.

TABLE I

Selenium And Cyanide Removal From Eluent Solution

| | | | Se Removal | | | CN Removal | |
|---|---|---|---|---|---|---|---|
| Ex | Agent | [Se][a], ppm | % | hrs | [CN][b], ppm | % | hrs |
| 34 | None | 80 | N/A[c] | N/A | 30 | N/A | N/A |
| 35 | 37 wt % HCl, 2,000 ppm (pH 4) | 53 | 46 | 4 | N/D[d] | N/A | N/A |
| 36 | 37 wt % HCl, 5,000 ppm (pH 2) | 11.7 | 84.5 | 48 | 27.5 | 8.3 | 48 |
| 37 | 37 wt % HCl, 9,000 ppm (pH 1) | 6.5 | 91.8 | 1 | 22 | 26.7 | 48 |
| 38 | 37 wt % HCl, 43,000 ppm (pH 0) | 13.9 | 82.6 | 1 | 26.1 | 13 | 48 |
| 39 | 30 wt % H$_2$O$_2$, 15,000 ppm | 76 | 5 | 48 | 9.1 | 69.7 | 48 |
| 40 | 30 wt % H$_2$O$_2$, 30,000 ppm | 74 | 7.5 | 48 | 0 | 100 | 48 |
| 41 | KMnO$_4$, 10,000 ppm | 59 | 26.2 | 1 | 14.1 | 53 | 48 |
| 42 | KMnO$_4$, 20,000 ppm | 72 | 10 | 1 | Sample lost | | |
| 43 | 5 wt % NaOCl, 15,000 ppm | 74 | 7.5 | 48 | 35.4 | 0 | 48 |
| 44 | 30 wt % H$_2$O$_2$, 15,000 ppm + FeCl$_2$.H$_2$O, 5,000 ppm | 11.8 | 85.3 | 8 | 3.1 | 89.7 | 48 |
| 45 | 30 wt % H$_2$O$_2$, 30,000 ppm + FeCl$_2$.H$_2$O, 10,000 ppm | 14.1 | 82.4 | 48 | 19.1 | 36.3 | 48 |
| 46 | CuCl$_2$.2H$_2$O, 1,000 ppm | 60 | 25 | 4 | 4.1 | 86.3 | 48 |
| 47 | CuCl$_2$.2H$_2$O, 2,000 ppm | 15 | 81.3 | 4 | 0 | 100 | 48 |

TABLE I-continued

Selenium And Cyanide Removal From Eluent Solution

| | | Se Removal | | | CN Removal | |
|---|---|---|---|---|---|---|
| Ex | Agent | [Se]$^a$, ppm | % | hrs | [CN]$^b$, ppm | % | hrs |
| 48 | CuCl$_2$.2H$_2$O, 4,000 ppm | 7.9 | 90.1 | 4 | 0 | 100 | 48 |
| 49 | CuCl$_2$.2H$_2$O, 6,000 ppm | 13 | 83.8 | 4 | 0 | 100 | 48 |
| 50 | CuCl$_2$.2H$_2$O, 8,000 ppm | 15 | 81.3 | 4 | 0 | 100 | 48 |
| 51 | CuCl$_2$.2H$_2$O, 10,000 ppm | 9 | 88.8 | 48 | 0.2 | 99.3 | 48 |
| 52 | CuCl$_2$.2H$_2$O, 20,000 ppm | 9.5 | 88.1 | 1 | 1.1 | 96.3 | 48 |
| 53 | (NH$_4$)$_2$Ce(NO$_3$)$_6$, 10,000 ppm | 38 | 52.5 | 48 | 22.5 | 25 | 48 |
| 54 | (NH$_4$)$_2$Ce(NO$_3$)$_6$, 20,000 ppm | 10.6 | 86.8 | 1 | 19.8 | 34 | 48 |

$^a$[Se] denotes "selenium concentration."
$^b$[CN] denotes "cyanide concentration."
$^c$N/A denotes "not applicable."
$^d$N/D denotes "not determined."

The data set forth in the above Table I indicate that below a pH of about 2, hydrochloric acid effectively precipitates selenium; peroxide and bleach destroy cyanide; above about 2,000 ppm, copper chloride effectively precipitates selenium and cyanide; and combinations of peroxide and ferrous chloride remove substantial amounts of selenium and cyanide.

EXAMPLES 55–71

Selenium Removal From Eluent

To 20 wt % NaCl eluent solutions having different selenium concentrations were added various precipitating agents. The resulting liquid phases were analyzed for Se and the results are reported in the following Table J.

TABLE J

Selenium Removal From Eluent Solution

| | | [Se]$^a$, ppm | | % Se |
|---|---|---|---|---|
| Ex | Agent | Initial | Final | Removal |
| 55 | AgNO$_3$, 10,000 ppm | 90 | 22 | 76 |
| 56 | SnCl$_2$, 10,000 ppm | 90 | 4 | 96 |
| 57 | SnCl$_2$, 20,000 ppm (pH 2.3) | 90 | <4 | >96 |
| 58 | CuSo$_4$, 10,000 ppm | 90 | 18 | 80 |
| 59 | SnCl$_2$, 20,000 ppm (pH 2.4) | 93 | 30 | 68 |
| 60 | SnCl$_2$, 10,000 ppm (pH 1.8) | 78 | 4 | 96 |
| 61 | CuSo$_4$, 10,000 ppm | 78 | 38 | 44 |
| 62 | SnCl$_2$, 2,500 ppm (pH 5.3) | 120 | 94 | 22 |
| 63 | SnCl$_2$, 5,000 ppm (pH 4.6) | 120 | 84 | 30 |
| 63 | SnCl$_2$, 7,500 ppm (pH 4.1) | 120 | 69 | 43 |
| 64 | SnCl$_2$, 12,500 ppm (pH 3.1) | 120 | 27 | 78 |
| 65 | SnCl$_2$, 20,000 ppm (pH 3.4) | 120 | 30 | 75 |
| 66 | SnCl$_2$, 20,000 ppm (pH 2.3) | 120 | 25 | 79 |
| 67 | SnCl$_2$, 40,000 ppm (pH 1.2) | 120 | <4 | >97 |
| 68 | H$_2$O$_2$, 4,500 ppm (pH 6.7) | 88 | 7.9 | 91 |
| 69 | HCl, 3,600 ppm (pH 1.8) | 91 | 1.9 | 98 |
| 70 | HCl, 3,600 ppm + Fe Powder, 15,000 (pH 4.1) | 100 | 3.2 | 97 |
| 71 | CuSO$_4$, 15,000 ppm (pH 5.4) | 81 | 2.8 | 97 |

The data presented in the above Table J indicates that stannous chloride, hydrochloric acid, a hydrochloric acid-iron combination, copper sulfate, and silver nitrate can precipitate up to and over about 97 percent of the selenium in an eluent solution.

EXAMPLES 72–86

Selenium Removal From Stripped Sour Water and Eluent Solution Using HCl

A stripped sour water having an initial pH of about 8 and an initial selenium concentration of about 5.7 ppm was treated with various amounts of a 37 weight percent HCl solution. In addition, a sodium chloride eluent solution having an initial pH of about 8 and an initial selenium concentration of about 94 ppm was treated with the 37 weight percent HCl solution. The selenium concentration in the liquid phase of each of the resulting materials was determined and results of these experiments are shown below in Table K.

TABLE K

| Ex | pH | Selenium Concentration, ppm |
|---|---|---|
| Selenium Removal From Stripped Sour Water Using HCl | | |
| 72 | 4 | 5.7 |
| 73 | 3 | 5.7 |
| 74 | 2 | 5.5 |
| 75 | 1 | 5.8 |
| 76 | 0 | 5.5 |
| Selenium Removal From Eluent Using HCl | | |
| 77 | 7 | 94 |
| 78 | 6 | 94 |
| 79 | 5 | 81 |
| 80 | 4 | 54 |
| 81 | 3 | 51 |
| 82 | 2 | 11.7 |
| 83 | 1 | 6.5 |
| 84 | 1 | 3.7 |
| 85 | 1 | 3.0 |
| 86 | 0 | 13.9 |

As shown by the data in the preceding Table K, pH reduction with hydrochloric acid effectively reduces the selenium content of an eluent at a pH below about 3, but has no apparent impact on stripped sour water.

EXAMPLES 87–97

Selenium Removal Using Stannous And Stannic Chloride

An oil refinery phenolic sour water having a selenium concentration of about 4.9 ppm was contacted with varying concentrations of stannous chloride and stannic chloride to precipitate selenium. The selenium concentration in the resulting liquid phase was measured and the results are reported below in Table L.

TABLE L

Selenium Removal With Stannous And Stannic Chloride

| Ex | Chemical | Amount Mole/liter | pH | Selenium, mg/l |
|---|---|---|---|---|
| 87 | None | Not applicable | 8 | 4.900 |
| 88 | $SnCl_2.2H_2O$ | 0.00099 | 6.1 | 4.700 |
| 89 | $SnCl_2.2H_2O$ | 0.00120 | 6.7 | 4.800 |
| 90 | $SnCl_2.2H_2O$ | 0.00200 | 3.5 | 3.400 |
| 91 | $SnCl_2.2H_2O$ | 0.00250 | 6.2 | 4.700 |
| 92 | $SnCl_2.2H_2O$ | 0.00397 | 2.8 | 2.800 |
| 92 | $SnCl_2.2H_2O$ | 0.00596 | 2.5 | 1.600 |
| 93 | $SnCl_2.2H_2O$ | 0.01000 | 2.4 | 0.200 |
| 94 | $SnCl_4$ | 0.000844 | 5 | 4.400 |
| 95 | $SnCl_4$ | 0.00173 | 4.8 | 4.400 |
| 96 | $SnCl_4$ | 0.00345 | 4.2 | 4.500 |
| 97 | $SnCl_4$ | 0.00499 | 2.6 | 4.400 |

The above data indicate that while stannous chloride can significantly reduce selenium concentration in stripped sour water, stannic chloride does not appear to have any substantial impact even at low pH.

Although the present invention has been described in considerable detail with reference to some preferred versions, other versions are possible. Therefore, the spirit and scope of the claims should not necessarily be limited to the description of the preferred versions contained herein.

What is claimed is:

1. A method for removing selenocyanate from an aqueous liquid, the method comprising the sequential steps of:
   (a) passing the aqueous liquid through an acrylic, strong base, anion exchange resin to produce a resin effluent having a total selenocyanate concentration less than the total selenocyanate concentration in the aqueous liquid;
   (b) eluting the resin with an aqueous solution to form a selenocyanate-containing eluent; and
   (c) repeating steps (a) and (b) at least 25 cycles without substantial fouling of the acrylic, strong base, anion exchange resin prior to regenerating said resin;
   herein said aqueous liquid comprises sour water.

2. The method of claim 1 wherein the aqueous liquid comprises phenolic sour water.

3. The method of claim 1 wherein step (b) comprises the step of eluting the resin with an aqueous solution comprising greater than 10 weight percent alkali metal chloride.

4. The method of claim 1 wherein step (b) comprises the step of eluting the resin with an aqueous solution comprising about 15 to about 30 weight percent alkali metal chloride.

5. The method of claim 1 wherein step (b) comprises the step of eluting the resin with an aqueous solution comprising about 20 to about 30 weight percent alkali metal chloride.

6. The method of claim 1 wherein the anion exchange resin is a Type II resin.

7. The method of claim 1 further comprising the step of contacting the eluent with a precipitating agent selected from the group consisting of copper chloride, stannous chloride, silver chloride, and gold chloride, or mixtures thereof to precipitate the selenocyanate present in the eluent.

8. The method of claim 1 further comprising the step of contacting the eluent with greater than about 1,000 to about 20,000 ppm copper chloride to precipitate the selenocyanate present in the eluent.

9. The method of claim 1 further comprising the sequential steps of (i) contacting the eluent with copper chloride to precipitate the selenocyanate present in the eluent and (ii) contacting the eluent with a base to raise the pH of the eluent to at least about 9.

10. The method of claim 1 further comprising the steps of (i) contacting the eluent with copper chloride and (ii) contacting the eluent with a base to raise the pH of the eluent to at least about 9, wherein at least a portion of steps (i) and (ii) are performed simultaneously.

11. The method of claim 1 wherein the aqueous liquid further comprises cyanide.

12. The method of claim 1 where step (c) comprises repeating steps (a) and (b) at least 50 cycles prior to regenerating the acrylic, strong base, anion exchange resin.

13. The method of claim 1 where step (c) comprises repeating steps (a) and (b) at least 100 cycles prior to regenerating the acrylic, strong base, anion exchange resin.

14. The method of claim 1 wherein the anion exchange resin is a Type I resin.

15. The method of claim 14 where step (c) comprises repeating steps (a) and (b) at least 50 cycles prior to regenerating the acrylic, strong base, anion exchange resin.

16. The method of claim 14 where step (c) comprises repeating steps (a) and (b) at least 100 cycles prior to regenerating the acrylic, strong base, anion exchange resin.

17. A method for removing selenocyanate from an oil refinery stripped sour water, the method comprising the sequential steps of
   (a) contacting the oil refinery stripped sour water with a prefilter to form a prefilter effluent;
   (b) passing the prefilter effluent through an acrylic, strong base, anion exchange resin to produce a resin effluent having a selenocyanate concentration less than the concentration of the selenocyanate in the stripped sour water;
   (c) eluting the resin with an aqueous solution to form a selenocyanate-containing eluent; and
   (d) repeating steps (a) through (c) at least 25 cycles without substantial fouling of the acrylic, strong base, anion exchange resin prior to regenerating said resin.

18. The method of claim 17 wherein the oil refinery stripped sour water further comprises a contaminant selected from the group consisting of arsenic, vanadium, and iron or mixtures thereof and the resin effluent has a contaminant concentration less than the concentration of the contaminant in the stripped sour water.

19. The method of claim 17 further comprising the step of contacting the eluent with a precipitating agent selected from the group consisting of copper chloride, stannous chloride, silver chloride, and gold chloride, or mixtures thereof to precipitate the selenocyanate present in the eluent.

20. The method of claim 17 further comprising the step of contacting the eluent with greater than about 1,000 to about 20,000 ppm copper chloride to precipitate the selenocyanate present in the eluent.

21. The method of claim 17 further comprising the steps of contacting the eluent with copper chloride to precipitate the selenocyanate present in the eluent and (ii) contacting the eluent with a base to raise the pH of the eluent to at least about 9.

22. The method of claim 17 further comprising the steps of (i) contacting the eluent with copper chloride to precipitate the selenocyanate present in the eluent and (ii) contacting the eluent with a base to raise the pH of he eluent to at least about 9, where at least a portion of steps (i) and (ii) are performed simultaneously.

23. The method of claim 17 wherein the anion exchange resin is a Type II resin.

24. The method of claim 17 where step (d) comprises repeating steps (a) through (c) at least 50 cycles prior to regenerating the acrylic, strong base, anion exchange resin.

25. The method of claim 17 where step (d) comprises repeating steps (a) through (c) at least 100 cycles prior to regenerating the acrylic, strong base, anion exchange resin.

26. The method of claim 17 wherein the anion exchange resin is a Type I resin.

27. The method of claim 26 where step (d) comprises repeating steps (a) through (c) at least 50 cycles prior to regenerating the acrylic, strong base, anion exchange resin.

28. The method of claim 26 where step (d) comprises repeating steps (a) through (c) at least 100 cycles prior to regenerating the acrylic, strong base, anion exchange resin.

* * * * *